United States Patent [19]

Nevill, Jr.

[11] Patent Number: 4,942,620
[45] Date of Patent: Jul. 17, 1990

[54] HIGH TEMPERATURE SENSOR FOR INDUCED VIBRATION DYNAMIC TOUCH SENSOR SYSTEM

[75] Inventor: Gale E. Nevill, Jr., Gainesville, Fla.

[73] Assignee: University of Florida, Gainesville, Fla.

[21] Appl. No.: 199,686

[22] Filed: May 31, 1988

[51] Int. Cl.$^5$ .................... G06K 9/00; B25J 13/08
[52] U.S. Cl. ........................ 382/58; 901/33; 901/46; 73/651
[58] Field of Search ............... 73/105, 579, 651; 382/3, 58

[56] References Cited

U.S. PATENT DOCUMENTS 3,781,798  12/1973  Hinks ............................ 382/58
3,956,734  5/1976   Radcliffe ........................ 382/3

Primary Examiner—Leo H. Boudreau
Assistant Examiner—Daniel Santos
Attorney, Agent, or Firm—Dennis P. Clarke

[57] ABSTRACT

A high temperature sensor for use with an induced vibration dynamic touch sensor system comprising a pad element adapted for sliding contact with an object so as to induce vibrations in the pad, a mechanical coupling means comprising a stiff, substantially straight member for coupling the pad to a transducer assembly, the transducer assembly for converting the vibrations into electrical signals. The electrical signals are processed to produce a normalized spectral signature characteristic of the size and shape of the object, and the sizes and shapes and nature of its surface features. A pattern vector is extracted from the spectral signature and subjected to discriminant analysis to classify and recognize the object.

19 Claims, 2 Drawing Sheets

HIGH TEMPERATURE SENSOR FOR INDUCED VIBRATION DYNAMIC TOUCH SENSOR SYSTEM

CROSS-REFERENCE TO RELATED APPLICATIONS

This application is continuation-in-part of U.S. Pat. application Ser. No. 723,644, filed Apr. 16, 1985, entitled "Induced Vibration Dynamic Touch Sensor System and Method, now Pat. No. 4748672, the disclosure of which is herein incorporated by reference.

Background of the Invention

This invention relates to tactile or touch sensor systems and methods particularly, although not exclusively, adapted for use with robotic devices and the like.

Robotics is rapidly becoming a major industry, and robotic devices are being used increasingly for such diverse purposes as manufacturing, assembly, metal forming and inspection, as well as in remote or hazardous environments. Although present generation robots are primarily preprogrammed to perform very specific tasks, major research efforts are underway to develop intelligent robots which are capable of reacting to changing environments and circumstances, and capable of imitating, to some extent, human functions and operations. This necessitates that a robot be capable of sensing its environment, and tactile or touch sensing is an important requirement for such purposes.

Early approaches to tactile sensing employed microswitches or binary pressure sensitive pads which provided little more than contact information. More recent approaches have employed proportional sensing elements typically arranged in an array or strategically located on the surface of a gripper to enable recognition of an object's shape and orientation. For the most part, tactile sensors are still primarily pressure sensitive or proximity sensitive devices, and known tactile sensors have a number of disadvantages.

It is recognized that a principal need for the next generation of robots is improved tactile sensing capable of providing continuously variable touch sensing over an area within which there is spatial resolution. Tactile sensor development in the past has been directed largely to improving transduction techniques and to increasing the spatial density of sensing arrays. The most commonly used transducer materials are conductive elastomeric, piezoresistive, or piezoelectric materials. Conductive elastomers have problems with nonlinearity, fatigue and nonrepeatability. Piezoresistive elements, although sensitive, linear and reliable, have a high per unit cost and poor spatial distribution limitations. Flexible piezoelectric polymers have attractive touch sensing possibilities and the advantages of being rugged, lightweight, and having good linearity and hysteresis characteristics, but their principal drawback is a lack of a DC response, thus necessitating the use of special signal capture techniques. Improving spatial density of sensor arrays requires smaller sensors, and there have been some efforts to develop smaller sensors.

As the use of tactile sensors becomes more widespread, a need will exist for sensors capable of operating at high temperatures for sensing objects whose surfaces are at elevated temperatures. Many of the above-mentioned sensors, particularly those of elastomeric or polymeric composition would not offer such a high temperature capability.

It is desirable to provide improved touch sensor systems particularly for use at high temperatures which avoid these and other disadvantages of known systems and methods, and it is to this end that the present invention is directed.

Summary of the Invention

The invention is based upon a new dynamic sensing concept which exploits active, sliding motion of the sensor to provide information characteristic of an object and its features. Sensor apparatus in accordance with the invention is simple, inexpensive and rugged, capable of providing outputs faster than current approaches, and is more versatile in determining surface textures, feature configurations, and precise feature locations and orientations. Moreover, sensor apparatus in accordance with the invention is adaptable to a wide range of operating conditions. In particular, the sensor of the present invention is advantageously used to provide information characterstic of an object whose surface is at high temperature.

The invention is based upon the concept that relative sliding motion between a sensor and an object produces vibrations or induces motion at the portion of the sensor in contact with the object which are characteristic of the object and its features, and that these vibrations or motions may be analyzed and interpreted to determine the character of the object. This is somewhat analogous to the manner in which humans detect the character of an object by rubbing their finger across it. Vibrations induced in the skin of the finger are transmitted to the brain where they are interpreted and correlated with familiar patterns.

This type of sensor obviously requires a portion of the sensor to come into contact with the object being characterized. Several uses for an induced vibration dynamic touch sensor are envisioned wherein the surface of the object to be sensed is at a relatively high temperature, substantially above room temperature. The present invention therefore provides a sensor in which a temperature-tolerant or temperature-resistant material is used as the portion of the sensor which will contact the object, while the portion of the sensor which analyzes and interprets vibrations induced by contact is maintained at a sufficient distance from the elevated temperature surface such that this portion of the sensor is not exposed to the elevated temperature. Vibrations or motions induced in the temperature resistant portion which contacts the object are transmitted to the analyzing and interpreting section via a mechanical coupling or linking means.

In the preferred embodiment disclosed in U.S. Pat. application Ser. No. 723,644, filed Apr. 16, 1985, of which this application is a continuation-in-part, a transducer assembly made of a flexible piezoelectric polymer, is mounted directly onto the backside of a flexible membrane, and vibrations induced in the membrane as variations in the surface of the object being characterized are encountered are directly transmitted to the transducer assembly. While certain changes in materials for the membrane and transducer would improve the ability of such an assembly to withstand elevated temperatures, it was also apparent that alternative sensor designs might prove to be better able to withstand the higher temperatures. Thus, it has been determined in accordance with the present invention that the transducer, which would not otherwise be able to withstand the high temperature applications, may, if spaced apart from the high temperature surface at a sufficient distance, be used in a sensor apparatus which further comprises a remote pad means used to contact the high temperature surface of the object and a mechanical linking means for linking these two elements.

Broadly in one aspect, the invention provides a sensor apparatus comprising a pad means having a lower surface, means for producing sliding contact between the lower surface of the pad and an object, means for mechanically coupling the pad to a transducer means and for spacing the pad from the transducer means at a predetermined distance, the transducer means for sensing vibrations and for producing an electrical signal corresponding to the vibrations, and means for deriving from the electrical signal a pattern characteristic of the object, and wherein vibrations induced in the pad during the sliding contact with the object are transmitted to the transducer means by the mechanical coupling means.

In another aspect, the invention provides a high temperature sensor for use with an induced vibration dynamic touch sensor system comprising a pad means for contacting a surface of an object to be sensed, a means for mechanically linking the pad to a remote transducer assembly, and the transducer assembly means for converting the mechanical strains induced by vibration of the pad means and transmitted by the mechanical linking means, into electrical signals to be analyzed by the induced vibration dynamic touch sensor system.

Description of the Preferred Embodiments

The invention is particularly well adapted for use with robots and other forms of mechanical manipulators, such as prosthetic devices, and will be described in that context. However, as will become apparent, the invention has greater utility.

As noted above, the invention contemplates producing relative sliding contact between a sensor and an object being sensed so as to induce vibrations in the sensor which are a function of the character of the object being sensed. The sensor of the present invention, which is especially well suited for use in determining the character of an object which has a surface at an elevated temperature, mechanically links a sensor pad which is capable of withstanding the elevated temperature to a transducer means spaced at a sufficient distance from the surface of the object to operate at ambient temperature. Vibrations induced in the transducer means are used in determining the character of an object.

As used herein, the character of an object means its size and shape, the sizes and shapes of surface features, patterns of features, orientations of features, surface texture, and feature dimensions and spacings. As will be described more fully later in the specification the electrical signals may be processed and analyzed using statistical analysis techniques to enable recognition of the object and/or its character. First, however, improved sensors in accordance with the invention will be described.

Figure 1:
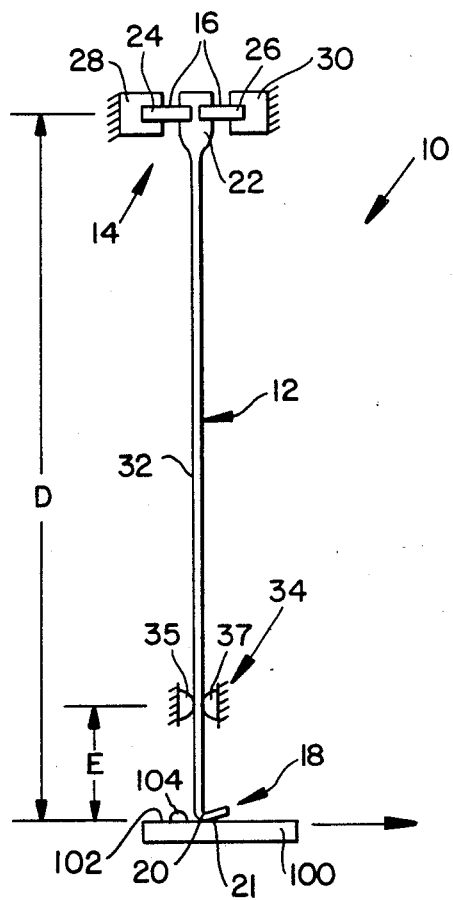
FIG. 1 is a side view of the high temperature sensor according to the present invention, shown partially in schematic view.

FIG. 1 illustrates a side view of a preferred embodiment of the high temperature sensor, indicated generally by numeral 10, of the present invention. As shown, the sensor 10 may comprise one or more elongated steel wires 12 connected at an upper end 14 to transducer assembly 16. At a lower end 18 of wire 12, a pad means 20 having a lower surface 21 for contacting the surface 102 of an object 100 being sensed is provided. In this preferred embodiment, pad means 20 is formed as an integral part of wire 12, by producing a greater than 90° bend in the wire, the pad means 20 thus comprising the lowermost extending surface of wire 12. It is to be recognized that where the terms "upper" and "lower" are used in this specification to describe or define portions of the sensor structure, the terms are used for simplicity in interpreting the figures presented. As such, these terms are not to be construed as limiting the orientation of sensor 10 of the present invention to the orientation shown in the Figures with respect to the object 100.

At the upper end 14 of wire 12, the wire is flattened to form tab 22. Tab 22 is joined to two transducer elements 24, 26, which comprise transducer assembly 16. Transducer elements 24, 26 are in turn mounted to stationary plate members 28, 30. Plate members 28, 30, may further form a part of a holder or mount which is to be disposed in a position enabling the sensor 10 to be positioned appropriately with respect to the object 100 to be sensed, and which will be adapted to effect relative sliding contact between the sensor 10 and the object 100. Plate members 28, 30 may alternatively be attached to a separate holder or mount (not shown as separate element) which is adapted to perform the functions as indicated above. Plate members 28, 30 forming a part of the holder or mount may further be a portion of a gripper, for example, of a mechanical manipulator which is adapted to either move relative to a stationary or moving object or to be held fixed with respect to a moving object.

The sensing function of this invention is premised on inducing vibrations in the transducer assembly 16, thereby causing strains to be introduced in the material making up the transducer elements 24, 26 which convert the strains, and thus the vibrations into electrical signals. A material well suited for this purpose is metallized polyvinylidene flouride (PVDF), which cannot, be effectively used at temperatures significantly above room temperature. The sensor 10 of the present invention overcomes this potential shortcoming in the characterization of high temperature objects by spacing the transducer assembly 16 from the surface of the object 100 to be sensed at predetermined distance (D) sufficient to maintain the transducer assembly 16 at or slightly above room temperature. This distance (D) is preferably significantly greater than the dimensions of the pad means.

The spacing is accomplished in the present invention by providing means for mechanically coupling the pad means 20, disposed at the lower end 18 of sensor 10 to contact the surface 102 of the object 100 being characterized, to the transducer assembly 16. This mechanical coupling or linking means, according to a preferred embodiment of the present invention, is an elongated, substantially straight member 32, which in the assembly shown, comprises a straight section of the wire 12 and tab 22, the straight member 32 being integral with and extending upwardly from pad means 20.

This straight member 32 is preferably sufficiently stiff so as to resist bowing and the like when larger surface irregularities are encountered. As such, the straight member 32 will induce vibration in the transducer assembly as the pad means 20 traverses the surface 102 of object 100, and encounters surface irregularities.

In the embodiment shown in FIG. 1, the sensor 10 is positioned such that pad means 20 is in nominal relative sliding contact with surface 102, which will be said to represent a substantially planar surface. As surface aberration 104 comes into contact with and passes under pad means 20, (said pad means) will be urged upwardly from surface 102. Straight member 32 comprising the mechanical coupling means will likewise be urged upwardly, and in turn, will cause transducer elements 24, 26 to move upwardly at the point of connection to tab 22. The movement induces strain in transducer elements 24, 26 which is converted to electrical signals for use in characterizing the object.

As transducer assembly 16 must be maintained at a distance (D) sufficient to isolate the assembly from the elevated temperatures at surface 102, which in some instances may be quite substantial, the straight member 32 is proved with a means for bracing the member to provide structural reinforcement, the means depicted in FIG. 1 as compliant mounting 34. The mounting 34 is disposed at a distance E from the lowermost portion of pad means 20 which is preferably closer to pad means 20 than to transducer assembly 16. Mounting 34 is especially desirable where the straight member 32 does not possess sufficient inherent stiffness when longer lengths of wire, for example, are used. Mounting 34 is adapted to abut the straight member 32 to restrain movement of the straight member 32 along the direction of travel of the object 100 being sensed, yet is designed to permit movement in a direction substantially perpendicular to the surface 102 of the object 100 being sensed (vertically as illustrated), or in other words along the longitudinal axis of the straight member 32.

It is envisioned that such a mounting will be employed in the majority of the devices built in accordance with the present invention, as an important feature in maintaining the transducer in a "cool" location away from the object's surface, is having a mechanical coupling means capable of transmitting the vibrations or movements of the pad means 20 due to surface aberrations to the transducer assembly 16 over lengths which are great compared to the dimensions of the sensor pad means 20. Compliant mounting 34 as shown in the preferred embodiment comprises a pair of opposing blocks 35 having resilient bumpers 37 facing one another on opposite sides of straight member 32.

Transducer assembly 16 may comprise one or more sensing or transducer elements 24, 26 which convert the vibrations induced at the pad means 20 into coresponding electrical signals. The sensing elements 24, 26 may be piezoelectric transducers which preferably comprise metallized polyvinylidene fluoride (PVDF) film (a piezoelectric polymer).

Figure 2:
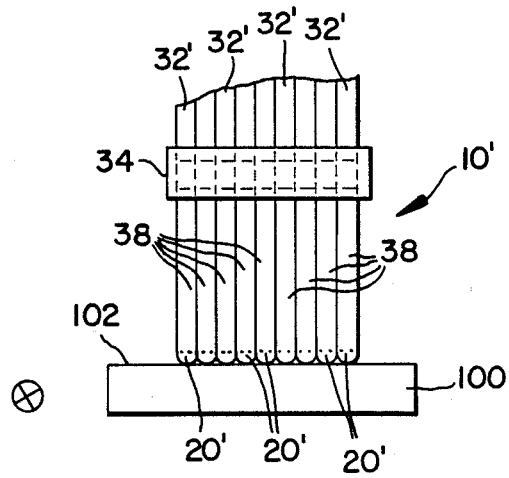
FIG. 2 is a partial front elevation view of the high temperature sensor according to the present invention.

FIG. 2 depicts the lower portion 36 of a sensor assembly 10' according to the present invention, wherein a plurality of wires 38 are employed to provide a "two-dimensional" or linear sensor assembly 10'. The symbol " " represents the direction of relative travel between sensor 10' and object 100, this symbol being commonly used to show movement "into the page", and is here intended to depict movement of the object 100 into the page.

It can thus be readily seen that this plurality of wires, each capable of independent movement, forms a linear array of pad means 20', which are capable of sensing a surface 102 of an object 100 across a width thereof. The corresponding plurality of mechanical coupling members 32' will transmit vibrations caused by caused by movement of pads 20' to a transducer assembly 16 (FIG. 1) made up of one or more pairs of transducer elements whereby vibration information will be converted to electrical signals and subsequently analyzed to characterize the object 100 being sensed.

It can be readily envisioned from the depictions in FIGS. 1 and 2, and the description of the operation of the sensors 10, 10', that the sensor may also comprise a "three-dimensional" sensor wherein, in one example, the linear array of wires 38, as shown in FIG. 2, is augmented by additional linear arrays, in front of and/or in back of the linear array shown in FIG. 2. This would equate to, in FIG. 1, assuming the side view depicted is a first linear array extending into the page, having additional linear arrays to the left of and/or to the right of, the array depicted therein. Additionally, it is envisioned that a plurality of wires having pad means at a lower end and elongated straight members extending up into connection with a transducer assembly can be provided in a "bundle" in a manner somewhat analogous to a fiber optic bundle configuration.

Figure 3:
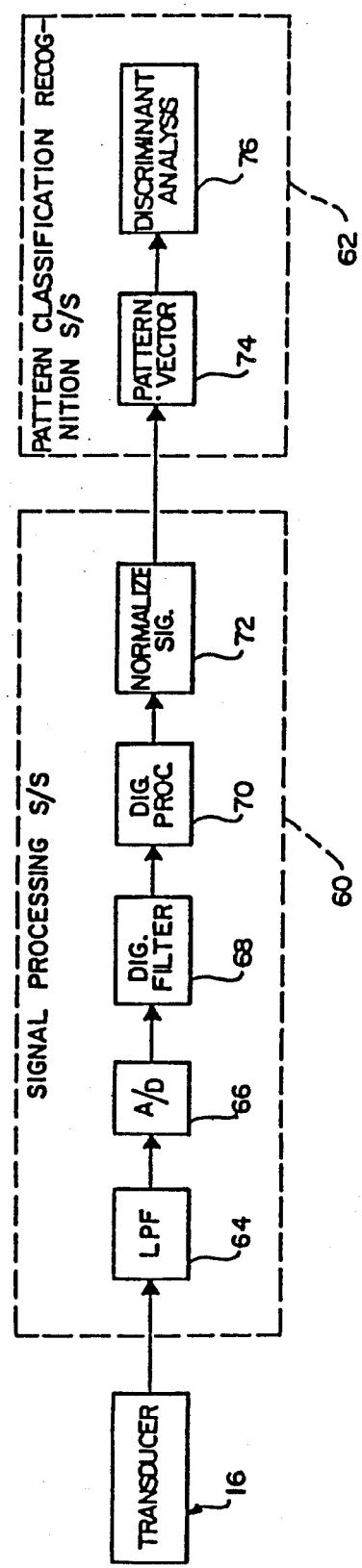
FIG. 3 is a block diagram of a sensor system in accordance with the invention.

FIG. 3 is a block diagram of a sensing system in accordance with the invention for use with an induced vibration dynamic touch sensor 10, such as illustrated in FIGS. 1 and 2. As shown, the system generally comprises a signal processing subsystem 60 and a pattern classification/recognition subsystem 62. The signal processing subsystem converts the signals produced by sensor 10 into normalized spectral signatures or patterns representative of the character of the object being sensed, and the pattern classification/recognition subsystem analyzes the normalized signatures to classify and recognize the object and its features. The signals from the processing subsystem comprise power or energy density spectra which are analyzed on the basis of their spectral or frequency content, and recognition is principally a problem of discrimination to classify correctly an observed pattern into one of a plurality of known groups. Accordingly, the system is first "taught" the different groups during a phase which establishes a standard pattern vector, or template, from a set of observations of known objects. Thereafter, an observed pattern is classified into a group with the closest fitting template. While many different techniques are available for analyzing and classifying spectral signatures, a preferred classification technique is discriminant analysis, which is a well-known statistical analysis technique that is commonly employed for spectral signature recognition as, for example, in speech recognition systems. The discriminant function employed by the invention is preferably linear and of the form $z_i = a_{i0} + a_{i1} \times x_1 + a_{i2} \times x_2 + \ldots + a_{in} \times x_n$ where $z_i$ is the classification score for group i, the x's are n pattern variables, each representing the area under the spectral density curve is a specified frequency band, and the a's are weighting coefficients which maximize the separability between the groups. Once the weighting coefficients have been determined, each observation is assigned membership into the group that produces the highest score.

Signal processing subsystem 60 converts the analog signals produced by the transducer assembly 16 of sensor 10 into normalized digital spectral signatures which are analyzed by the pattern classification/recognition subsystem 62 to classify the signatures into the groups in accordance with the characteristics of the objects being sensed. The signal processing subsystem first filters the signals from a transducer in a low pass filter 64, and converts the filtered signals to digital signals in an A/D converter 66. The signals are further filtered in a digital filter 68 and supplied to a digital processor 70 to produce a spectral signature. The spectral signatures are normalized at 72 by making the area under the spectral density curve equal to unity for the frequency band of interest, which may be taken to extend from 0–800 Hz, for example. The normalized signatures are then supplied to the pattern classification/recognition subsystem 15 where they may be converted to pattern vectors at 74 by assigning each of a plurality of areas under the spectral density curve within a specified frequency increment, e.g., 25 Hz, to a different pattern variable. For example, breaking the 0–800 Hz frequency band of each signal from the sensor into contiguous 25 Hz frequency increments and assigning the area under the curve in each increment to a different pattern variable produces 32 pattern variables for each transducer signal. The pattern vectors may then be subjected to a discriminant analysis at 76 for analysis and classification, as previously described.

Signal processing susbsystem 60 may simply comprise a commercially available digital signal analyzer, such as a Hewlett Packard model 5420A signal analyzer. A processing time of 320 msec. may be used for processing the 0–800 Hz signals. Since the H.P. signal analyzer processes one channel of information at a time, two such 320 msec. periods are required to process the signals from the two transducer elements. The pattern classification/recognition subsystem 62 may simply comprise a computer embodying a commercially available statistical software package which performs discriminant analysis, such as, for example, a BMDP-7M statistical software package described, for example, in Dixon, W. J., et al, *BMDP Statistical Software,* University of California Press, Berkeley, California, 1983. It is desirable to reduce the dimensionality of the pattern vector by selecting a subset of variables based upon their contribution to the discrimination process. The stepwise discriminant analysis of the BMDP software accomplishes this by sequentially adding variables that add the most to the separation of the groups, and continues to add variables that significantly contribute to the discrimintion.

The signal processing susbsystem and pattern classification/recognition subsystem illustrated in FIG. 3 and described above have the advantage of being easily implemented with readily available components. It will be appreciated, however, that other system configurations and other spectral analysis techniques may also be employed.

Experimental tests have been performed with a prototype of the high temperature sensor according to the present invention. The test apparatus included a sensor support and positioning structure, a turntable for moving objects and surfaces relative to the sensor, and a Hewlett Packard 5420A Digital Signal Analyzer for obtaining spectral signatures. The test objects, similar to object 100 in the Figures, were mounted on plastic disks which were in turn mounted to the turntable. The sensor was positioned such that the objects would pass directly beneath the sensor when the turntable was rotated. The straight member 32 and pad means 20 were made from a single length of 0.030 inch steel wire bent as shown in FIG. 1 at the pad end and flattened at the upper end to form tab 22. The tab 22 was bonded to two PVDF film strips, using epoxy, the strips serving as transducer elements 24,26.

Tests were conducted on samples of pitted steel and aluminum plate, the aluminum plate having a rolling direction capable of being determined visually. In 19 cases using the prototype sensor, a classification was correctly made 100% of the time.

The high temperature sensor when used in combination with the induced vibration dynamic touch sensor system in accordance with the present invention provides powerful capabilities despite the relative simplicity of design. Moreover, different pad configurations and arrays of pad means may be employed to render the sensor more suitable for certain applications, depending on the nature of the characterization to be performed. Furthermore, other types of transducers such as piezoceramics or strain gages, may be employed, as well as different types of signal processing techniques and algorithms.

Various applications which may be envisioned for sensors in accordance with the invention other than for high temperature sensing include edge following applications, search applications in underwater or other environments where optical sensing is limited, bin-picking applications to select components from a bin based upon their size, shape or surface features, as well as various types of inspection tasks, to name a few.

While a preferred embodiment of the invention has been shown and described, it will be appreciated by those skilled in the art that changes may be made in this embodiment without departing from the principles and spirit of the invention, the scope of which is defined in the appended claims.

What is claimed is:

1. Sensor apparatus comprising:
    pad means having a lower surface for contacting a surface of an object;
    means for producing sliding contact between said lower surface of said pad means and an object;
    means for mechancially coupling said pad means to a transducer means and for spacing said pad means from said transducer means at a predetermined distance, said mechanical coupling means comprising an elongated, substantially straight member connected to said transducer means near an upper end and connected to said pad means at a lower end;
    said pad means and said elongated straight member being made of material capable of withstanding temperatures substantially above room temperature;
    said transducer means for sensing vibrations and for producing an electrical signal corresponding to the vibrations;
    means for deriving from the electrical signal a pattern characteristic of the object; and
    wherein vibrations induced in said pad means during said sliding contact with said object are transmitted to said transducer means by said mechanical coupling means.

2. The sensor apparatus of claim 1 wherein said elongated straight member is of sufficient length whereby said predetermined spacing of said transducer means from said pad means will substantially isolate said transducer means from elevated temperatures when a surface of said object is at a temperature substantially above room temperature.

3. The sensor apparatus of claim 1 wherein said mechanical coupling means further comprises a means for bracing said elongated member, said bracing means disposed near said lower end thereof, said bracing means being so constructed and arranged to permit said elongated member to be translated in a direction substantially along a longitudinal axis of said member, said bracing means further restraining movement of said elongated member in other directions.

4. The apparatus of claim 1 further comprising means responsive to the pattern form identifying the object.

5. The apparatus of claim 4, wherein the identifying means comprises means for comparing the pattern to stored patterns of known objects.

6. The apparatus of claim 1, wherein the pattern comprises a multiple variable pattern vector characteristic of the object and said electrical signal comprises a spectral density signature corresponding to the vibrations, and each variable of the pattern vector corresponds to the energy contained in the signature in a different frequency increment.

7. The apparatus of claim 6, wherein said deriving means comprises means for performing a discriminant analysis on the pattern vector.

8. The apparatus of claim 7, wherein said performing means comprises a computer.

9. The apparatus of claim 1, wherein said transducer means comprises means for sensing vibrations primarily in a predetermined direction.

10. The apparatus of claim 1, wherein said transducer means comprises a piezoelectric polymer of PVDF.

11. A high temperature sensor for sue with an induced vibration dynamic touch sensor system comprising:
   a pad means for contacting a surface of an object to be sensed, said pad means being integral with said straight member, and said pad means further comprises a lower end of said steel wire, said lower end being bent to form a lower surface of said wire for contacting said object to be sensed;
   means for mechanically linking said pad to a remote transducer assembly means comprising an elongated, substantially straight member of steel wire, said elongated straight member being connected to said transducer assembly means at an upper end of said wire; and
   said transducer assembly means for converting mechanical strains induced in said transducer assembly means by vibration of said pad means into electrical signals, said electrical signals to be analyzed by said induced vibration dynamic touch sensor system, said vibration being transmitted to said transducer assembly means from said pad means by said linking means.

12. A high temperature sensor as described in claim 11 wherein said elongated straight member is of sufficient length to space said remote transducer assembly means from said pad means at a distance sufficient to permit said transducer assembly means to operate at substantially room temperature when a surface of said object to be sensed is at a temperature substantially above room temperature.

13. A high temperature sensor as described in claim 11 further comprising positioning means for positioning said elongated straight member in an orientation substantially normal to said surface of said object to be sensed.

14. A high temperature sensor as described in claim 11 further comprising means for bracing said straight member, said bracing means being adapted to permit said straight member to move in a direction along a longitudinal axis of said member and to restrain movement of said straight member in other directions.

15. A high temperature sensor as described in claim 11 wherein said sensor further comprises a plurality of said elongated straight members of steel wire, each of said straight members having an associated integral pad means, each of said elongated straight members being connected to said transducer assembly means at an upper end of said straight member, wherein each of said pad elongated straight members and integral pad means is capable of independent movement.

16. A high temperature sensor as described in claim 15, further comprising positioning means for positioning said plurality of elongated straight members in an orientation substantially normal to said surface of said object to be sensed.

17. A high temperature sensor as described in claim 15 further comprising means for bracing said plurality of elongated straight members, said bracing means being adapted to permit each of said plurality of straight members to move in a direction along a longitudinal axis thereof and to restrain movement of each of said straight members in other directions.

18. A high temperature sensor as described in claim 14 wherein said bracing means comprises a compliant mounting further comprising a set of resilient bumpers disposed to substantially abut two sides of said elongated straight member near said lower end thereof.

19. A high temperature sensor as described in claim 17 wherein said bracing means comprises a compliant mounting further comprising a set of resilient bumpers disposed to substantially abut two sides of each of said plurality of said elongated members near said lower end thereof.

* * * * *

UNITED STATES PATENT AND TRADEMARK OFFICE
CERTIFICATE OF CORRECTION

PATENT NO. : 4,942,620

DATED : July 17, 1990

INVENTOR(S) : Gale E. NEVILL, JR.

It is certified that error appears in the above-identified patent and that said Letters Patent is hereby corrected as shown below:

Column 9:

Claim 4, line 2: delete "form" and substitute -- for --.

Claim 11, line 1: delete "sue" and substitute -- use --.

Signed and Sealed this

First Day of October, 1991

Attest:

HARRY F. MANBECK, JR.

Attesting Officer

Commissioner of Patents and Trademarks